Figure 1:
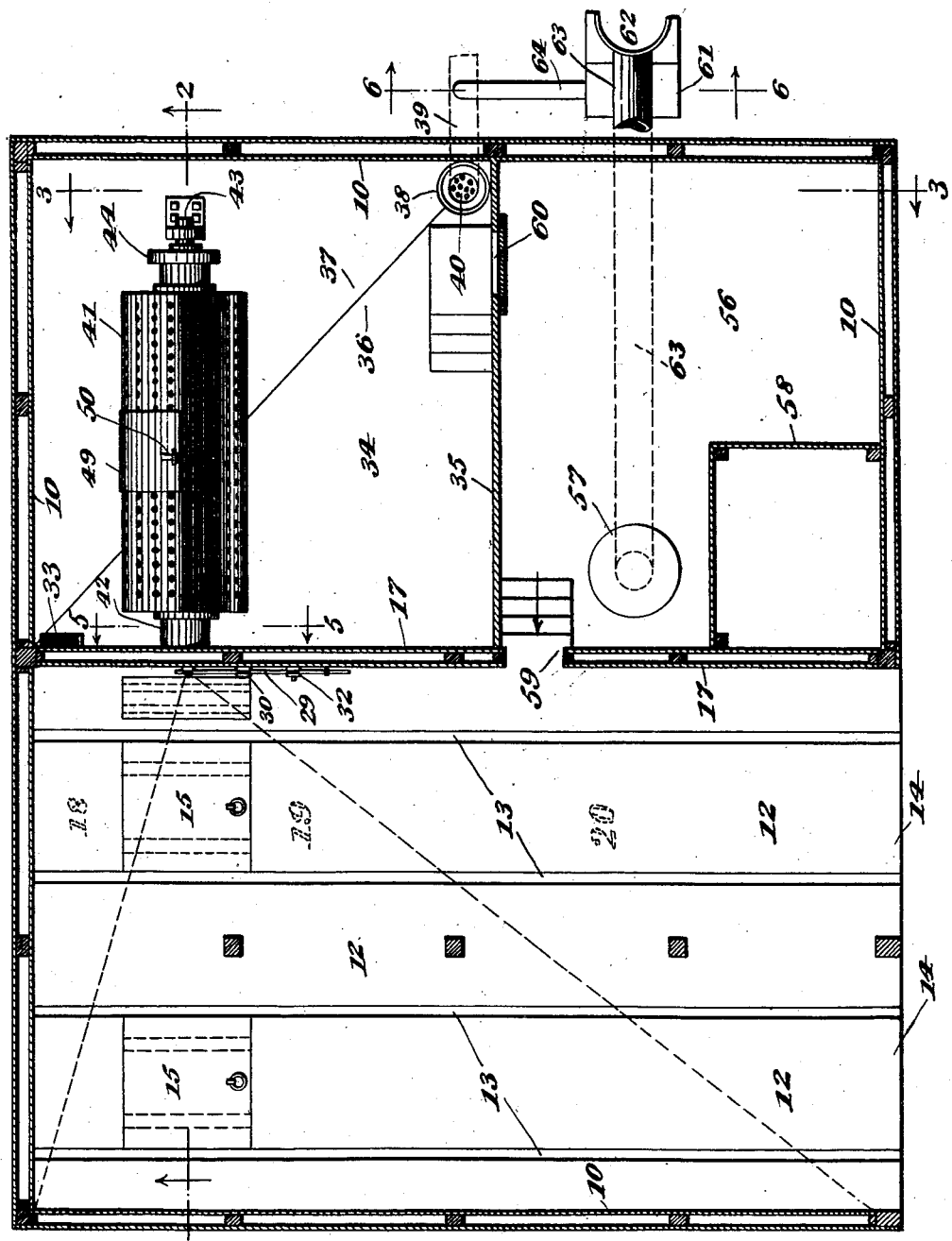

No. 863,305. PATENTED AUG. 13, 1907.
P. E. McDONNELL, Jr.
NIGHT SOIL REDUCTION PLANT.
APPLICATION FILED DEC. 4, 1906.

4 SHEETS—SHEET 1.

Witnesses
Inventor
Patrick E. McDonnell, Jr.
By Chas. C. Tillman
Attorney.

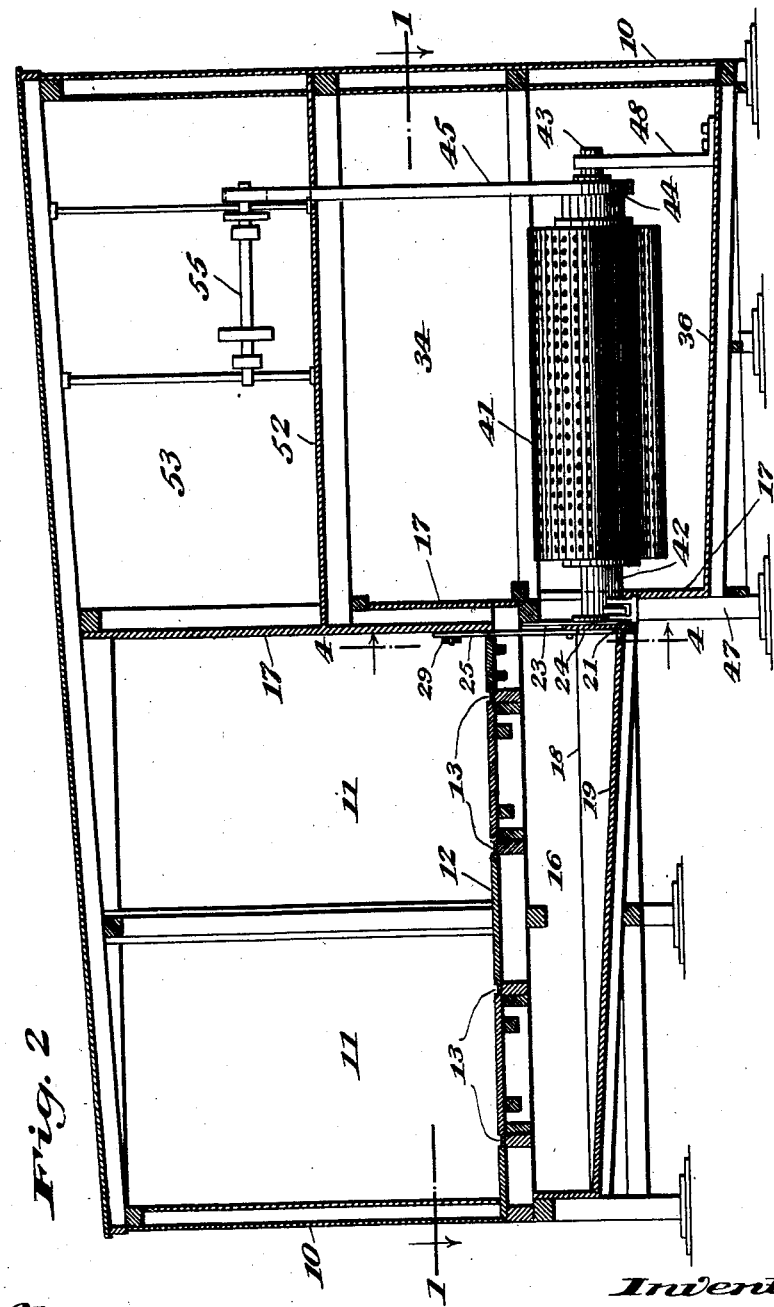

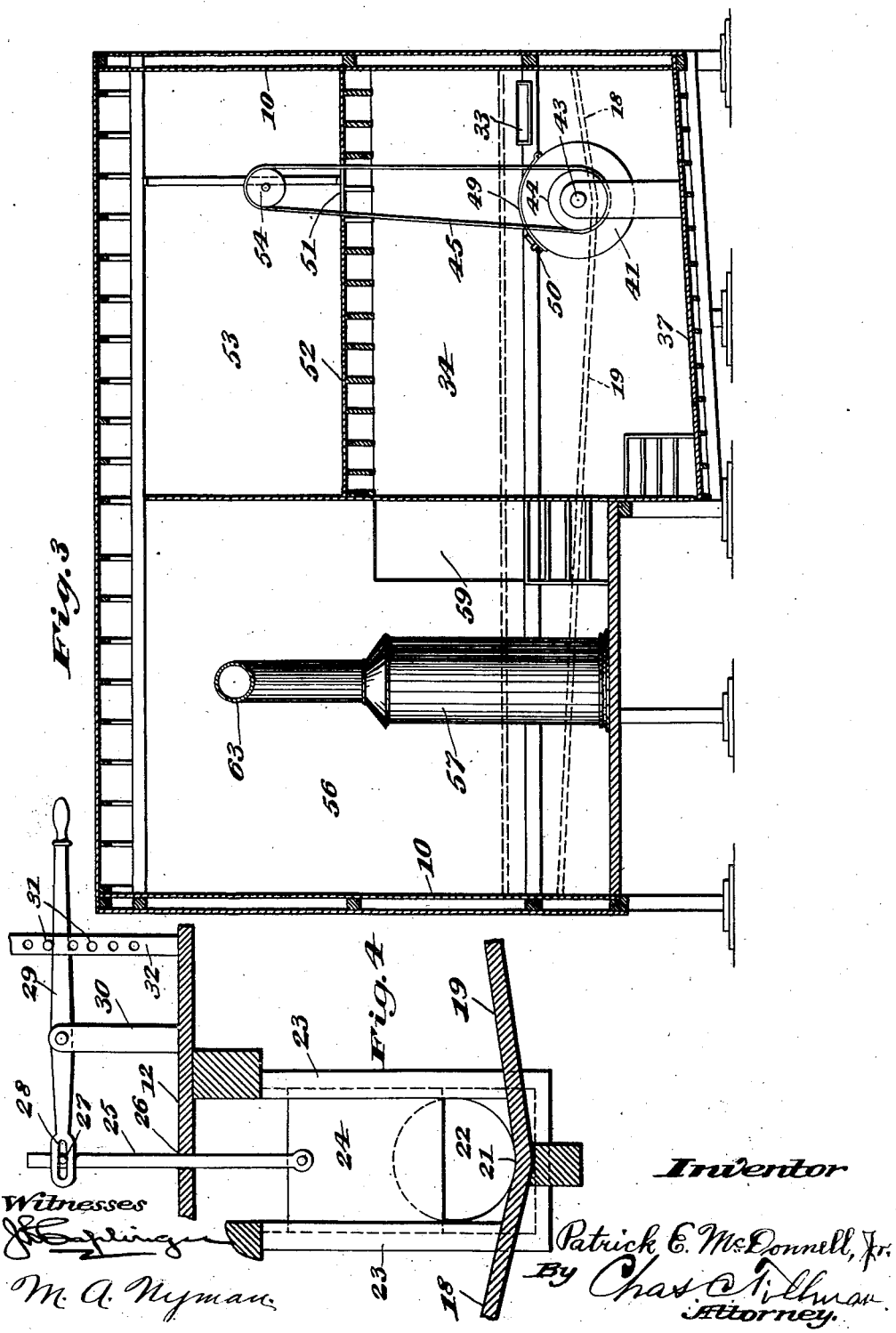

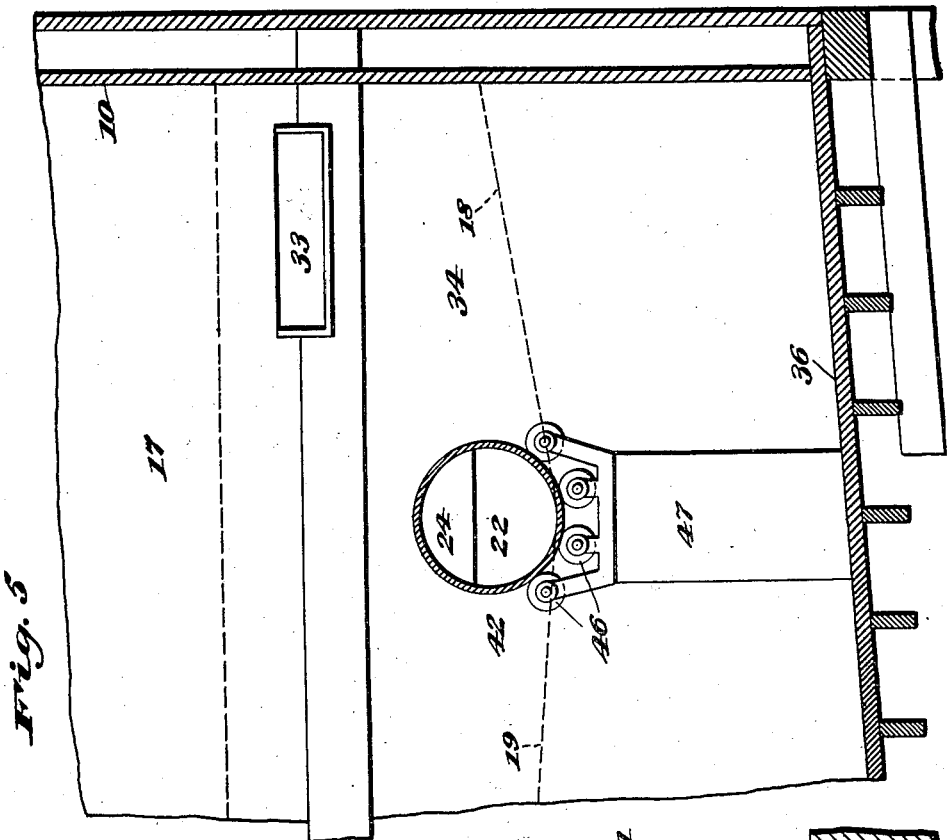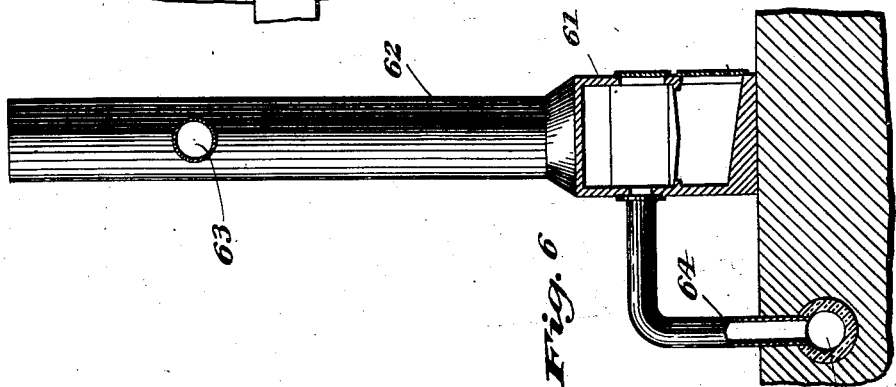

UNITED STATES PATENT OFFICE.

PATRICK E. McDONNELL, JR., OF CHICAGO, ILLINOIS.

NIGHT-SOIL-REDUCTION PLANT.

No. 863,305.  Specification of Letters Patent.  Patented Aug. 13, 1907.

Application filed December 4, 1906. Serial No. 346,300.

*To all whom it may concern:*

Be it known that I, PATRICK E. McDONNELL, Jr., a citizen of the United States, residing at Chicago, in the county of Cook and State of Illinois, have invented certain new and useful Improvements in a Night-Soil-Reduction Plant, of which the following is a specification.

This invention relates to improvements in a plant and apparatus for the treatment and disposal of fecal or excretory matters, commonly called "night soil," and it consists in certain peculiarities of the construction, novel arrangement, and operation of the various parts thereof, as will be hereinafter more fully set forth and specifically claimed.
The principal object of the invention is to furnish simple and effective means for receiving and so treating night soil or fecal matter as to separate the solid and fluid matters, and to conduct the latter to a proper subterranean drain or outlet, such as a sewer, and in such a manner that the odors and infectious or noxious gases emanating from the fecal matter may be controlled and destroyed, or conducted off where their discharge cannot injuriously effect neighboring residents.
Various other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1 is a plan sectional view taken on line 1, 1 of Fig. 2 of a plant embodying my invention. Fig. 2 is a vertical sectional view taken on line 2, 2 of Fig. 1 looking in the direction indicated by the arrows. Fig. 3 is a similar view taken on line 3, 3 of Fig. 1 looking in the direction indicated by the arrows. Fig. 4 is an enlarged fragmental sectional view taken on line 4, 4 of Fig. 2 as indicated by the arrows, showing a gate or valve used to control the flow of the matter from the reservoir or depositing compartment into the separating cylinder, and illustrating means for operating said gate. Fig. 5 is a vertical sectional view taken on line 5, 5 of Fig. 1 looking in the direction indicated by the arrows, of a portion of the separating and outlet compartment, showing the manner of mounting the ends of the separating cylinder and also illustrating an overflow outlet from the reservoir;—and—Fig. 6 is an enlarged view partly in section and partly in elevation taken on line 6, 6 of Fig. 1, showing the means for conducting the gases from the drain or sewer to the fire-box of a furnace.

Like numerals of reference, refer to corresponding parts throughout the different views of the drawings.
The reference numeral 10 designates a building, of suitable size and material, which is divided into various compartments for receiving, depositing and discharging the fecal matter, as well as for the separating apparatus and machinery for operating the same.

Adjacent to one end of the building 10, a receiving chamber or entrance hall 11 is produced, which has an elevated floor 12, provided with parallel tracks 13, extending from one of the side walls of the building 10 to the other side wall thereof, one of which walls may be left open, as shown at 14 in Fig. 1, or may be provided with suitable doorways for the purpose of admitting the vehicles, such as dumping wagons, in which the refuse or fecal matter is collected and transferred to the plant. The floor 12 of the chamber or compartment 11 may be reached by an inclined platform (not shown) leading to the open end of said chamber. Near the closed end of the chamber 11, the floor 12 is provided with a number of trap-doors 15, which close suitable openings through which the matter may be dumped from the wagons or vehicles into the reservoir 16, which is located below the floor 12 of the receiving chamber and is tightly closed by means of side and end walls and a partition 17 to prevent the escape of odors and gases.

The floor of the reservoir 16 is preferably formed of three sections 18, 19 and 20, as shown by dotted lines in Fig. 1 and by continuous lines in Figs. 2 and 4 of the drawings. The sections 18 and 20 of the floor are inclined towards the section 19, which is interposed between them and each of these sections of the floor of the reservoir 16 is inclined to a common point 21 adjacent to the partition 17, which forms one of the walls of the receiving chamber 11, as well as one of the walls of the reservoir 16, and which has therein an opening 22, the lower portion of which is in line with the trough or chute formed by the sections of the floor of the reservoir. On each side of the opening 22 in the partition 17 and within the reservoir 16 is located an upright guide 23, between which is slidably mounted a gate 24 used for opening and closing the opening 22. Pivotally connected at its lower end to the upper end of the gate or valve 24 is a rod or bar 25, which is extended through a suitable opening 26 in the floor 12 of the receiving chamber, and has on its upper portion a horizontal projection or pin 27 to engage a slot 28 in one end of an operating lever 29, which is fulcrumed on a standard 30 mounted on the floor 12 of the receiving chamber near the partition 17, and which lever may be held in the desired position by means of a removable pin inserted in openings 31 in an upright 32 located within the receiving chamber.

The partition 17 is provided just below the floor 12 with an outlet 33, which leads into the separating and discharge chamber 34, which is produced by means of the outer walls 10 of the building, the partition 17 and a partition 35, which is extended from the partition 17 to the wall 10 at one end of the building, as is clearly shown in Fig. 1 of the drawings. The floor of the separating and discharge chamber 34 is preferably formed of two triangular sections 36 and 37, which are inclined towards each other at their meeting edges and are also inclined towards one corner of the room 34, in which corner is located and extends downwardly an outlet pipe or tube 38, which communicates with a drain or sewer 39 located under the ground. The upper portion of the outlet pipe 38 is provided with a perforated plate or strainer 40 to prevent the passage of solids through said pipe. By inclining the sections 36 and 37, which comprise the floor of the separating and discharge chamber 34, towards each other and also towards the discharge pipe 38, it is apparent that a trough or chute will be provided for conducting the material from the separating cylinder to the outlet. The separating cylinder or drum 41, which is perforated as shown in Figs. 1 and 2 of the drawings and is provided at its end adjacent to the reservoir with a hollow trunnion 42, which registers with the opening 22 in the partition 17 and the other end of the cylinder, is also provided with a trunnion or stub shaft 43 on which is mounted a pulley 44 to which a belt 45 is applied for rotating the cylinder 41. The trunnion or hollow stub shaft 42 of the separating cylinder is mounted on anti-friction rollers 46, which are journaled on the upper portion of an upright 47, and the stub shaft 43 is suitably journaled on an upright 48 located within the discharging chamber. The separating cylinder 41 has in its peripheral wall a suitable opening, which is closed by means of a door 49 hinged at one of its edges thereto and provided with means 50 at its other edge to fasten the same in place.

As shown in Figs. 2 and 3 of the drawings, the belt 45 which transmits power to the pulley 44 for rotating the separating cylinder 41 passes through a suitable opening 51 in the floor 52 of the engine room 53, which is located above the separating and discharge chamber and over a pulley 54 mounted on a shaft 55 journaled in the engine room, and which shaft may be driven by any suitable means, but usually by an engine located in the room 53. In that end of the building in which the discharge chamber 34 and engine room 53 is located is produced by the partitions 17 and 35 and walls of the building a boiler room 56, in which a boiler 57, of any desired type, is located for supplying steam to the engine. This room may be provided with a coal-bin 58 and a door-way 59 leading through the partition 17 to the receiving chamber 11, and said room may also have a door-way 60 in the partition 35 leading into the discharge room 34, as is clearly shown in Fig. 1 of the drawings.

Located at a suitable point outside of the building and near the boiler-room is a furnace 61 with the chimney or smoke stack 62 of which the boiler 57 has communication at a considerable distance above the furnace through a pipe 63, or flue. Communicating at one of its ends with the drain or sewer 39 is a riser or pipe 64, which communicates at its other end with the fire-box of the furnace 61 above the grate therein which is used for conducting the gases from the sewer or drain 34 to the fire-box, so that they may be consumed therein or discharged through the smoke stack 62 of the furnace.

The operation is simple and as follows:—The wagons or vehicles loaded with the night soil or fecal matter are brought into the receiving chamber 11 on the tracks 13 on the floor thereof until they are at proper points to discharge their loads, when the trap-doors 15 may be opened and the contents of the wagons dumped through the openings or door-ways closed by said doors into the reservoir 16, from whence the matter will flow by reason of the inclined and trough or chute-like floor of the reservoir to its lower portion and against the gate or valve 24, which normally occupies a closed position. By opening the gate 24, which may be done through the instrumentality of the operating lever 29 and connecting rod 25, it is apparent that the matter which is in semi-liquid form and to which water may be added while in the reservoir will flow through the hollow trunnion or stub shaft 42 into the separating cylinder 41, which, after a sufficient quantity of the fecal matter or night soil has been placed therein, may be caused to rotate rapidly by applying power thereto through the belt 45 from the engine and shaft 55, in which operation the liquid and semi-liquid material will be thrown from the cylinder, while the solid matter, such as stones, bricks, pieces of glass, crockery, and the like, will be retained in the cylinder and can be removed therefrom through the door-way which the door 49 of the cylinder closes. After the liquid or semi-fluid matter has been discharged from the cylinder, the trough-like floor of the discharge chamber 34 will conduct it to the outlet pipe 38, from whence it will pass into the drain or sewer pipe 38, as is obvious. In passing out through the outlet pipe 38, the sieve 40 will serve to catch and hold any solid particles that may have passed through the perforations of the cylinder, and it is manifest that they can be readily removed from the said sieve, thus preventing them from entering the drain or sewer to clog the same. By providing the furnace 61 with the pipe 64 which communicates with the sewer or drain 39, as before stated, it will be understood that the noxious gases and odors which have been confined within the reservoir 16 and discharge chamber 34 will be conducted from the drain or sewer to the furnace, where they will be consumed or caused to pass out through the smoke stack or chimney of the furnace.

Having thus fully described my invention, what I claim as new, and desire to secure by Letters Patent, is—

1. A night soil reduction plant consisting of a structure having a receiving chamber provided with door-ways in its floor and doors for closing the same, a reservoir beneath said chamber and having a declivitous floor, a separating and discharge chamber located adjacent to the reservoir and a part thereof below the floor of the reservoir and having a declivitous floor, an outlet at the lower portion of said floor leading to a drain, a perforated separating cylinder rotatably mounted in the separating and discharge chamber and having communication at one of its ends with the reservoir, and means to rotate said cylinder, substantially as described.

2. A night soil reduction plant consisting of a structure having a receiving chamber provided with door-ways in its floor and doors for closing the same, a reservoir beneath said chamber and having a declivitous floor, a separating and discharge chamber located adjacent to the reservoir and a part thereof below the floor of the reservoir and having a declivitous floor, an outlet at the lowest portion of said floor leading to a drain, an opening in the wall of the reservoir adjacent to the separating and discharge chamber, a gate to open and close said opening, a perforated separating cylinder rotatably mounted in the separating chamber and having communication at one of its ends with said opening, and means to rotate said cylinder, substantially as described.

3. A night soil reduction plant consisting of a structure having a receiving chamber provided in its floor with doorways and doors to close the same, a reservoir beneath said chamber and having a declivitous floor, a separating and discharge chamber located adjacent to the reservoir and a part thereof below the floor of the reservoir and having a declivitous floor, an outlet at the lowest portion of said floor leading to a drain, a perforated separating cylinder rotatably mounted in the separating chamber and having communication at one of its ends with the reservoir, means for rotating said cylinder, a furnace suitably located near the outlet leading to the drain, and a pipe communicating at one of its ends with the drain and at its other end with the furnace, substantially as described.

4. A night soil reduction plant consisting of a structure having a receiving chamber provided in its floor with doorways and doors for closing the same, a reservoir beneath said chamber and having a declivitous floor, a separating and discharge chamber located adjacent to the reservoir and a part thereof below the floor of the reservoir and having a declivitous floor, an outlet in the lower portion of said floor leading to a drain, a perforated separating cylinder rotatably mounted in the separating chamber and having communication at one of its ends with the reservoir, means to rotate said cylinder, a boiler room located adjacent to the separating chamber, a furnace located near the outlet leading to the drain, a pipe communicating at one of its ends with the drain and at its other end with the furnace, a boiler located in the boiler room and having communication with the smoke stack or chimney of the furnace, substantially as described.

5. A night soil reduction plant consisting of a structure having a receiving chamber provided in its floor with doorways and doors for closing the same, parallel tracks on the floor of the receiving chamber, a reservoir beneath said chamber and having a declivitous trough-like floor, a separating and discharge chamber located adjacent to the reservoir and a part thereof below the floor of the reservoir and having a declivitous trough-like floor, an outlet at the lowest portion of said floor leading to a drain, a partition separating the receiving chamber and reservoir from the separating and discharge chamber and having an opening at the lowest point of the trough-like floor, a perforated separating cylinder rotatably mounted in the separating chamber and having at one of its ends a hollow trunnion in communication with the opening in said partition, and means to open and close said opening, substantially as described.

PATRICK E. McDONNELL, Jr.

Witnesses:
CHAS. C. TILLMAN,
M. A. NYMAN.